US011197173B2

(12) United States Patent
Barker et al.

(10) Patent No.: US 11,197,173 B2
(45) Date of Patent: Dec. 7, 2021

(54) MULTI-BAND CELLULAR ANTENNA SYSTEM

(71) Applicant: QUINTEL CAYMAN LIMITED, Grand Cayman (KY)

(72) Inventors: David Edwin Barker, Stockport (GB); Peter Chun Teck Song, San Jose, CA (US)

(73) Assignee: Quintel Cayman Limited, Grand Cayman (KY)

( * ) Notice: Subject to any disclaimer, the term of this patent is extended or adjusted under 35 U.S.C. 154(b) by 8 days.

(21) Appl. No.: 16/924,388

(22) Filed: Jul. 9, 2020

(65) Prior Publication Data
US 2020/0344615 A1 Oct. 29, 2020

Related U.S. Application Data

(63) Continuation of application No. 16/409,532, filed on May 10, 2019, now Pat. No. 10,735,978.
(Continued)

(51) Int. Cl.
*H04W 16/28* (2009.01)
*H01Q 3/38* (2006.01)
(Continued)

(52) U.S. Cl.
CPC ............ *H04W 16/28* (2013.01); *H01Q 1/246* (2013.01); *H01Q 3/38* (2013.01); *H01Q 5/50* (2015.01);
(Continued)

(58) Field of Classification Search
CPC .... H01Q 1/246; H01Q 21/0025; H01Q 21/22; H01Q 3/38; H01Q 5/50; H01Q 1/243;
(Continued)

(56) References Cited

U.S. PATENT DOCUMENTS 5,631,898 A 5/1997 Dent
9,867,192 B2 * 1/2018 Krzymien ............ H04B 7/0639
(Continued)

FOREIGN PATENT DOCUMENTS

CN 103311669 A 9/2013
CN 103401072 A 11/2013

OTHER PUBLICATIONS

International Search Report and Written Opinion mailed in corresponding PCT/US2019/031846 dated Sep. 10, 2019, 11 pages.

*Primary Examiner* — Liton Miah
(74) *Attorney, Agent, or Firm* — Tong, Rea, Bentley & Kim LLC

(57) ABSTRACT

An antenna system may include a first phase shifting network to output a first set of component signals from a first component signal having a first frequency, a second phase shifting network to output a second set of component signals from a second component signal having a second frequency, the first frequency being less than the second, and an antenna array, the first phase shifting network to impart a first tilt angle for the first set of component signals, the second phase shifting network to impart a second tilt angle for the second set of component signals, and a single variable electrical tilt controller to control the first and second phase shifting networks and being configured to maintain a ratio between the first tilt angle and the second tilt angle, where the first tilt angle is greater than the second tilt angle, and where the ratio is less than one.

16 Claims, 9 Drawing Sheets

Related U.S. Application Data

(60) Provisional application No. 62/670,488, filed on May 11, 2018.

(51) Int. Cl.
| | | |
|---|---|---|
| *H01Q 5/50* | (2015.01) | |
| *H01Q 21/00* | (2006.01) | |
| *H01Q 21/22* | (2006.01) | |
| *H01Q 1/24* | (2006.01) | |

(52) U.S. Cl.
CPC ......... *H01Q 21/0025* (2013.01); *H01Q 21/22* (2013.01)

(58) Field of Classification Search
CPC ............. H04W 16/28; H04W 28/0231; H04W 84/005; H04W 84/02; H04W 84/06; H03F 1/56; H04B 7/0456; H04M 1/0266
See application file for complete search history.

(56) References Cited

U.S. PATENT DOCUMENTS

| | | | |
|---|---|---|---|
| 10,340,583 B2 * | 7/2019 | Barker ................... | H01Q 1/36 |
| 10,484,059 B2 * | 11/2019 | Faxer ..................... | H04B 7/066 |
| 2006/0192711 A1 * | 8/2006 | Haskell ................... | H01Q 3/36 |
| | | | 342/372 |
| 2008/0211716 A1 | 8/2008 | Haskell | |
| 2009/0322610 A1 * | 12/2009 | Hants ....................... | H01Q 3/36 |
| | | | 342/372 |
| 2013/0235806 A1 * | 9/2013 | Nilsson ................ | H04B 1/0067 |
| | | | 370/328 |
| 2014/0050280 A1 * | 2/2014 | Stirling-Gallacher ..................... |
| | | | H04B 7/0617 |
| | | | 375/296 |
| 2014/0334564 A1 * | 11/2014 | Singh ................... | H04B 7/0456 |
| | | | 375/267 |
| 2015/0009951 A1 * | 1/2015 | Josiam ................. | H04L 5/0094 |
| | | | 370/330 |
| 2015/0333412 A1 * | 11/2015 | Angeletti ............... | H01Q 21/20 |
| | | | 700/98 |
| 2016/0013563 A1 | 1/2016 | Timofeev et al. | |
| 2016/0111785 A1 | 4/2016 | Park | |
| 2016/0134007 A1 | 5/2016 | Ding et al. | |
| 2017/0163351 A1 | 6/2017 | Puleri et al. | |
| 2017/0346181 A1 | 11/2017 | Hojjat et al. | |
| 2018/0076881 A1 * | 3/2018 | Zhu ..................... | H04B 7/0434 |
| 2019/0053013 A1 * | 2/2019 | Markhovsky ............. | G01S 5/06 |

* cited by examiner

MULTI-BAND CELLULAR ANTENNA SYSTEM

CROSS REFERENCE TO RELATED APPLICATIONS

This application is a continuation of U.S. patent application Ser. No. 16/409,532, filed May 10, 2019, which claims priority to U.S. Provisional Patent Application Ser. No. 62/670,488, filed May 11, 2018, all of which are herein incorporated by reference in their entireties.

FIELD OF THE DISCLOSURE

The present disclosure relates generally to antenna systems, and more particularly to matching service footprints of different component frequencies.

BACKGROUND

A base station antenna designed for broadband mobile communications networks may include one or more arrays, each array comprising a plurality of radiating antenna elements, and the arrays being capable of supporting one or multiple spectrum bands. The antenna elements of each array are connected to a radio frequency (RF) beamforming network (also referred to as a RF distribution network or a RF feed network), which is designed to distribute RF power to the antenna elements, when considering a signal for transmission via the array. The antenna elements of the array are typically arranged in a vertical plane and designed to create a relatively narrow radiation pattern beam in the elevation plane (of between 5 and 15 degrees, for example). Phase shifters may also be used between the RF feed network and the antenna elements. The phase shifters are used to impart a linearly varying phase slope along the antenna array and hence vary the boresight direction of the radiated pattern in the elevation plane. This is known as variable electrical tilt (VET) in order to control and optimize the cellular network coverage and interference parameters.

Mobile telecommunications operators deploy base station equipment which may include a baseband apparatus, radio equipment, and antennas. The radio equipment has been traditionally designed to provide RF signals for only one RF band, which in turn is connected to one or more radiating arrays of the base station antenna. For multiple RF bands at a base station site, multiple radios are connected to correspondingly multiple antennas. Each radio plus antenna combination may have the capability to vary the antenna beam tilt associated with the RF band connected to the antenna, for network design optimization purposes.

SUMMARY

In one example, the present disclosure provides an antenna system that includes a first phase shifting network to output a first set of component signals from a first component signal having a first frequency, a second phase shifting network to output a second set of component signals from a second component signal having a second frequency, where the first frequency is less than the second frequency, and an antenna array comprising a plurality of antenna elements coupled to the first phase shifting network and to the second phase shifting network. In one example, the first phase shifting network is to impart a first tilt angle to a first radiation pattern of the antenna array for the first set of component signals, and the second phase shifting network is to impart a second tilt angle to a second radiation pattern of the antenna array for the second set of component signals. The antenna system may also include a single variable electrical tilt controller to control the first phase shifting network and the second phase shifting network, where the single variable electrical tilt controller is configured to maintain a ratio between the first tilt angle and the second tilt angle, where the first tilt angle is greater than the second tilt angle, and where the ratio of the second tilt angle to the first tilt angle is less than one.

In another example, the present disclosure provides an antenna system that includes an antenna array comprising a plurality of antenna elements, a first baseband beamforming unit, to apply a first plurality of precoding weights to a first set of component signals associated with a first frequency, and a second baseband beamforming unit, to apply a second plurality of precoding weights to a second set of component signals associated with a second frequency, where the first frequency is less than the second frequency. In one example, the first plurality of precoding weights is to impart a first tilt angle to a first radiation pattern of the antenna array for the first set of component signals, the second plurality of precoding weights is to impart a second tilt angle to a second radiation pattern of the antenna array for the second set of component signals, and the first plurality of precoding weights and the second plurality of precoding weights are configured to maintain a ratio between the first tilt angle and the second tilt angle, where the first tilt angle is greater than the second tilt angle, and where the ratio of the second tilt angle to the first tilt angle is less than one. In another example, the first plurality of precoding weights is to impart a first beamwidth to a first radiation pattern of the antenna array for the first set of component signals, the second plurality of precoding weights is to impart a second beamwidth to a second radiation pattern of the antenna array for the second set of component signals, and the first plurality of precoding weights and the second plurality of precoding weights are configured to maintain the first beamwidth and the second beamwidth to provide a same mainbeam far-field radiation pattern for both the first radiation pattern and the second radiation pattern.

In yet another example, the present disclosure provides an antenna system that includes an antenna array comprising a plurality of antenna elements and a feed network to: create signal pairs from an input signal having at least a first component signal of a first frequency and a second component signal of a second frequency, impart frequency-dependent phase differences to the signal pairs, and impart amplitude differences to the signal pairs, the amplitude differences of each signal pair dependent upon the frequency-dependent phase differences of the signal pair, the signal pairs comprising antenna element drive signals of the plurality of antenna elements of the antenna array, where the antenna element drive signals provide a first array illumination function for the first frequency and a second array illumination function for the second frequency, where the second frequency is greater than the first frequency, and where the second illumination function has a greater amplitude taper compared to the first illumination function.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure include antenna systems for multi-band cellular base station deployment. In particular, examples of the present disclosure provide elevation plane radiation patterns for different RF component frequencies such that the resultant service cell range or footprint for different RF component frequencies are substantially similar, over a range of variable mainbeam tilt angles. Examples of the present disclosure may be used with baseband carrier aggregation features in access technologies such as Long Term Evolution (LTE). For instance, aligning component carrier footprints with each other maximizes carrier aggregation efficiency and also avoids unnecessary inter-cell interference in the wider cellular network.

Dual band (and multi-band) technologies simultaneously support proximate RF bands through one radio equipment. For example, in the United States, the 700 MHz and 850 MHz bands provide macrocellular service and have been supported using separate 700 MHz and 850 MHz radio equipment, connected to separate antennas, or at least separate antenna connections on a multi-port antenna. Dual-band radios allow a reduction in equipment or "box" count for mobile operators at base station sites. Furthermore, 4G radio access technologies and beyond such as Long Term Evolution (LTE) allow bonding of two or more RF channels from different bands together to support higher traffic capacity solutions, referred to as carrier aggregation (CA). RF bands such as 850 MHz in the United States are being re-purposed from supporting 3G access technologies to 4G/LTE access technology, which then permits carrier aggregation to be used. Cellular networks using carrier aggregation can be optimized by ensuring the service coverage footprints of the component RF bands are aligned or overlaid on top of each other. This could be achieved by varying the beam tilt of the antenna supporting each RF band. If one band has less coverage extent than another band in a dual-carrier, carrier aggregation example, then this may result in the benefits of dual-carrier, carrier aggregation not being available to all mobile subscribers.

Dual-band radios transmit and receive signals in the two RF bands, together being connected to the same antenna. The antenna may include an array of antenna elements designed for wideband operation in that the antenna is able to support both bands. For example an antenna capable of operating in the range 698-960 MHz can support both the 700 MHz and 850 MHz RF bands used in the USA. The antenna array may have a directional radiation beam in the elevation plane, which may be between 5 and 15 degrees beamwidth, depending upon the length of the antenna array and frequency. The radiation beam may also be tilted in the elevation plane to optimize for coverage and minimize inter-cell interference.

Figure 1A:
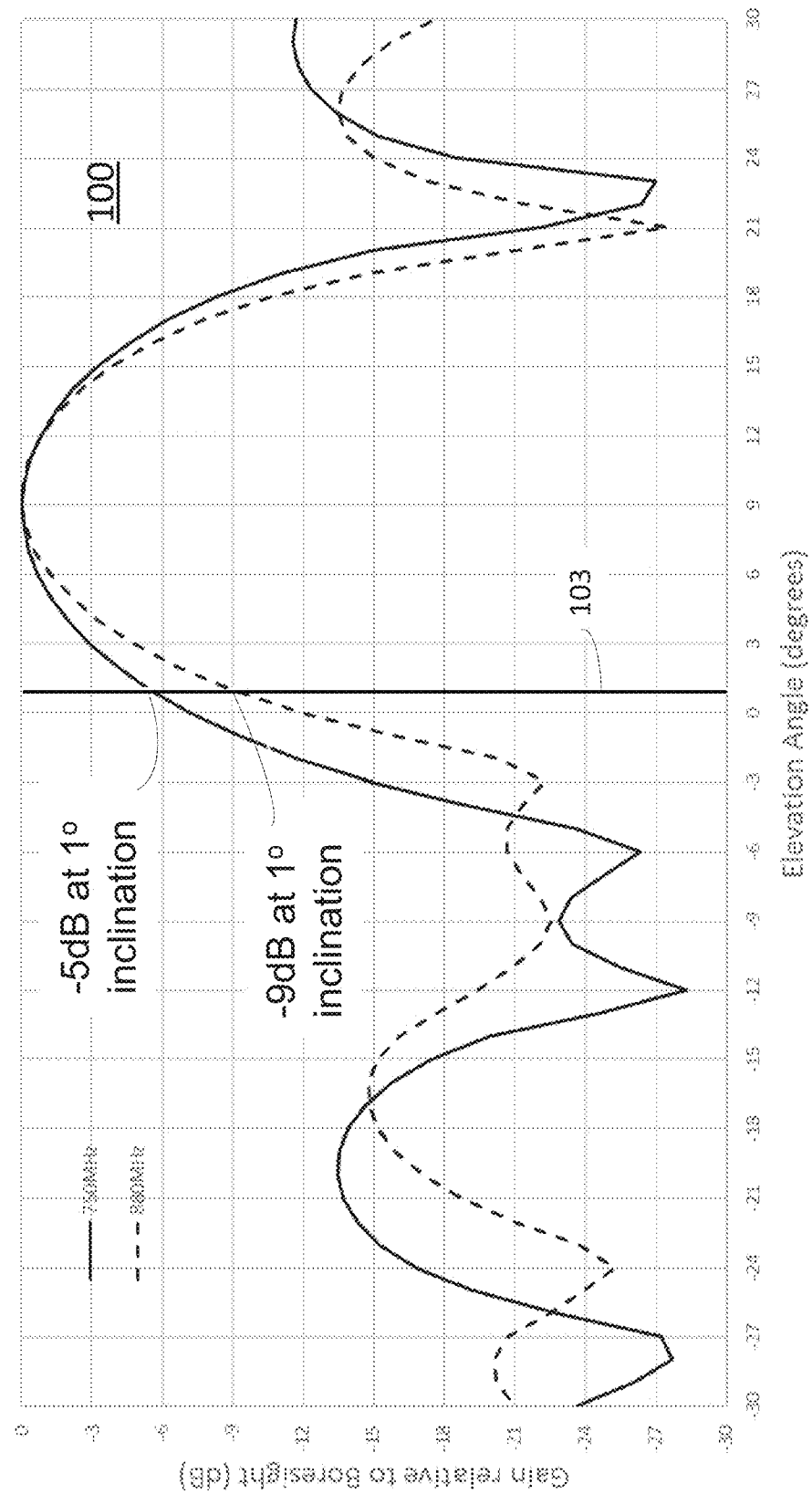
FIG. 1A shows a graph of the elevation radiation patterns for RF signals at 750 MHz and 880 MHz, of an antenna system with dual-band radios being connected to the same antenna array and tilted at a 9 degree tilt angle.

FIG. 1A shows a graph 100 of the elevation radiation patterns for RF signals at 750 MHz (solid plot) and 880 MHz (dotted plot), of a commercially available antenna system with dual-band radios being connected to the same antenna array and tilted at a 9 degree tilt angle. FIG. 1A is presented in Cartesian coordinates from elevation angles −30 degrees (pointing toward the sky) to +30 degrees (pointing toward the ground). The vertical line 103 in FIG. 1A is a 1 degree inclination angle representing the angle from the base station antenna at 25 m above ground to the edge of the cell service coverage area at 1.4 km distance away from the base station site, which is typical of many cell sites.

Figure 1B:
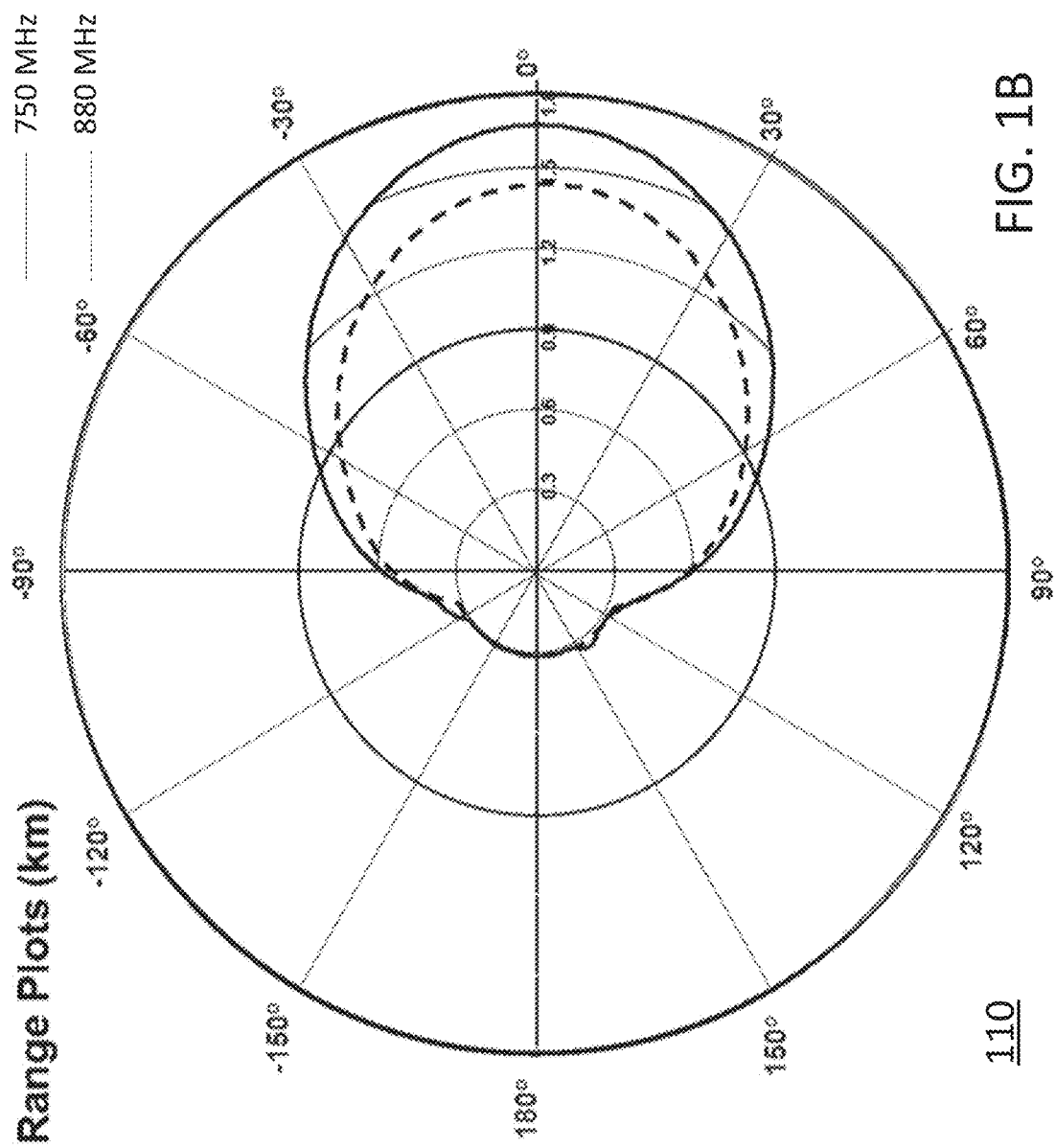
FIG. 1B illustrates a plot of the approximate coverage service area served by each RF component signal of FIG. 1A.

FIG. 1B illustrates a plot 110 of the approximate coverage service area served by each RF component. The intersection of the 750 MHz and 880 MHz radiation patterns in FIG. 1A at this 1 degree inclination angle reveals a 4 dB difference in radiated signal strength at the cell edge between the two RF bands, 1.7 km away. Despite the 880 MHz and 750 MHz signals having the same beam tilt, the 750 MHz signal component will arrive at the cell edge some 4 dB stronger than the 880 MHz signal (e.g., assuming no other propagation differences are accounted for). Notably, the elevation beamwidth narrows with higher frequencies since beamwidth is an inverse function of array length (which is fixed in this case) and frequency. This may result in a degraded 750 MHz signal component towards the cell edges due to an increase in inter-cell interference. The 750 MHz signal could be re-optimized for inter-cell interference by using a more aggressive tilt angle, but this may introduce a reduced signal component footprint at 880 MHz.

Figure 2A:
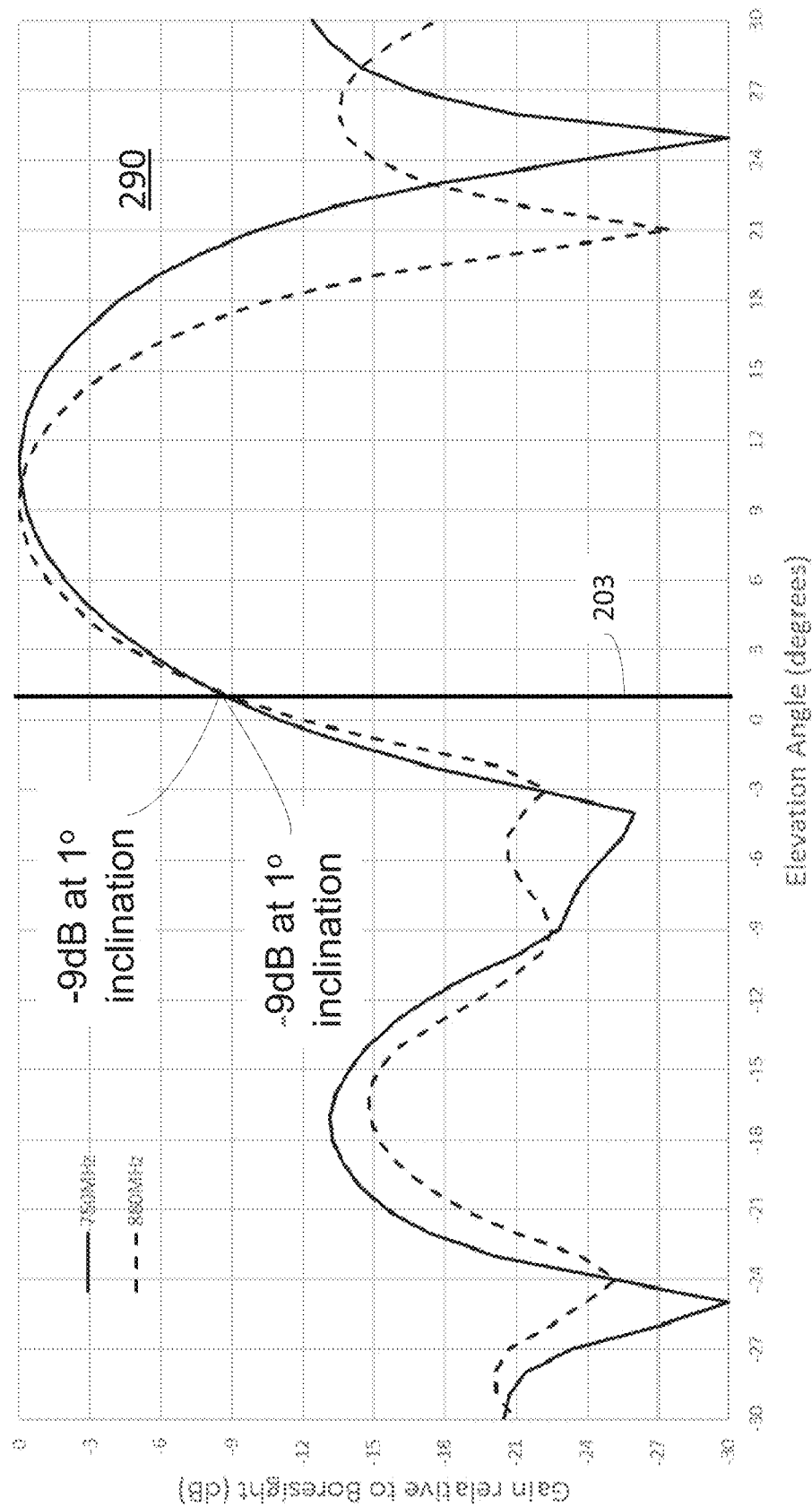
FIG. 2A illustrates a graph of the elevation radiation patterns for RF signals at 750 MHz and 880 MHz, of a commercially available antenna system with dual-band radios and the 750 MHz signal tilted at 11 degrees and the 880 MHz signal tilted at 9 degrees.
Figure 2B:
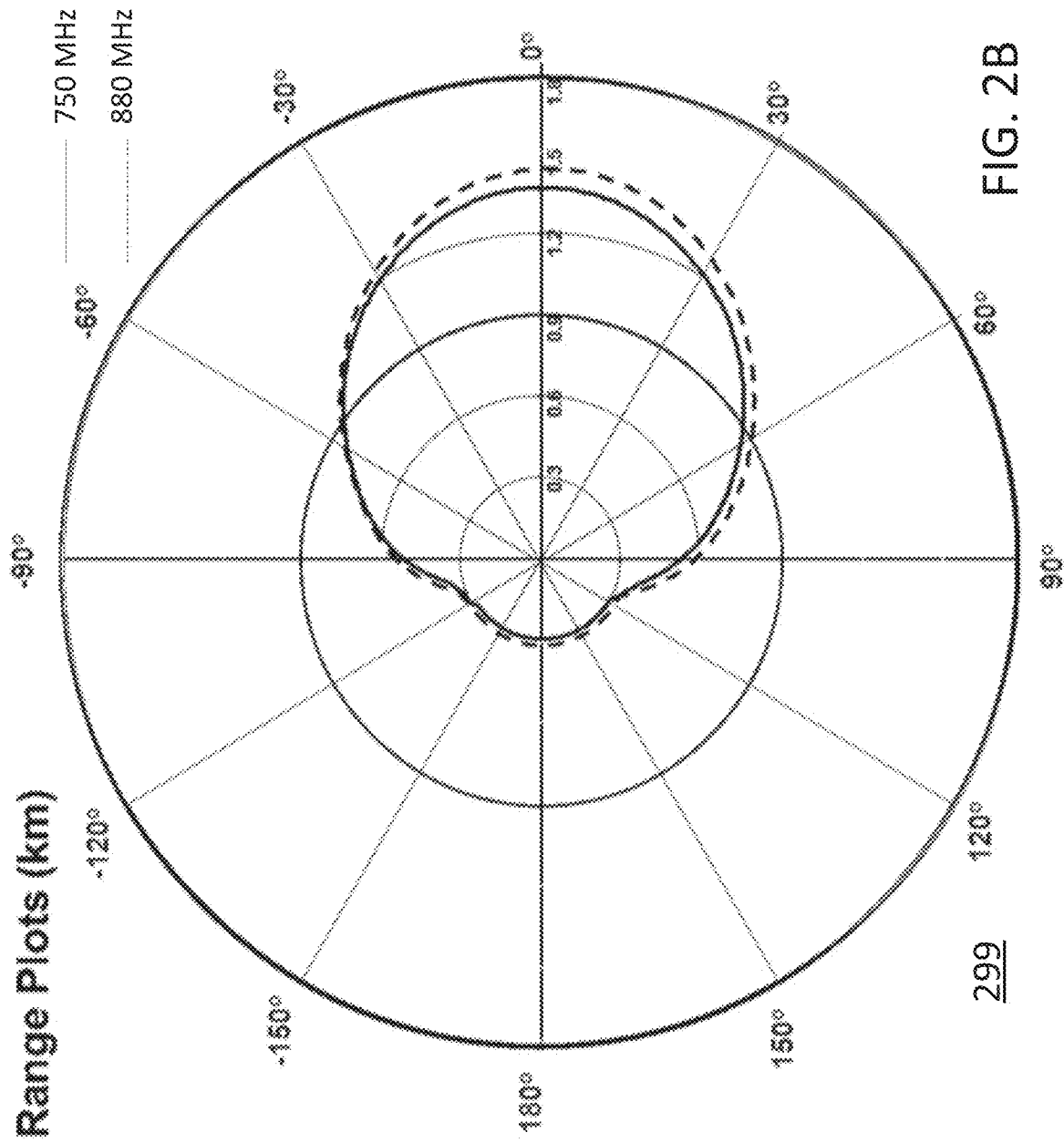
FIG. 2B illustrates a plot of the approximate coverage service area served by each RF component signal of FIG. 2A.

One solution to provide an antenna array capable of supporting multiple RF bands which has an elevation radiation pattern over a range of angles which does not change, or changes minimally, with frequency, involves using a diplexer to separate the different band signals (e.g., 750 MHz and 880 MHz) from a dual-band radio and then routing the frequency dependent component signals to separate antennas or antenna ports which allow the elevation patterns to be tilted independently. FIGS. 2A and 2B illustrate the result where the 750 MHz signal component is tilted at 11 degrees rather than 9 degrees. In particular, FIG. 2A shows a graph 290 of the elevation radiation patterns for RF signals at 750 MHz (solid plot) and 880 MHz (dotted plot), of a commercially available antenna system with dual-band radios and the 750 MHz signal component is tilted at 11 degrees and the 880 MHz signal tilted at 9 degrees. The vertical line 203 in FIG. 2A is a 1 degree inclination angle representing the angle from the base station antenna at 25 m above ground to the edge of the cell service coverage area at 1.4 km distance away from the base station site. FIG. 2B illustrates a plot (299) of the approximate coverage service area served by each RF component. The disadvantage of using a diplexer and independent tilt controls is that it requires managing and calculating two tilt angles, and possibly having additional antennas at site.

Figure 3:
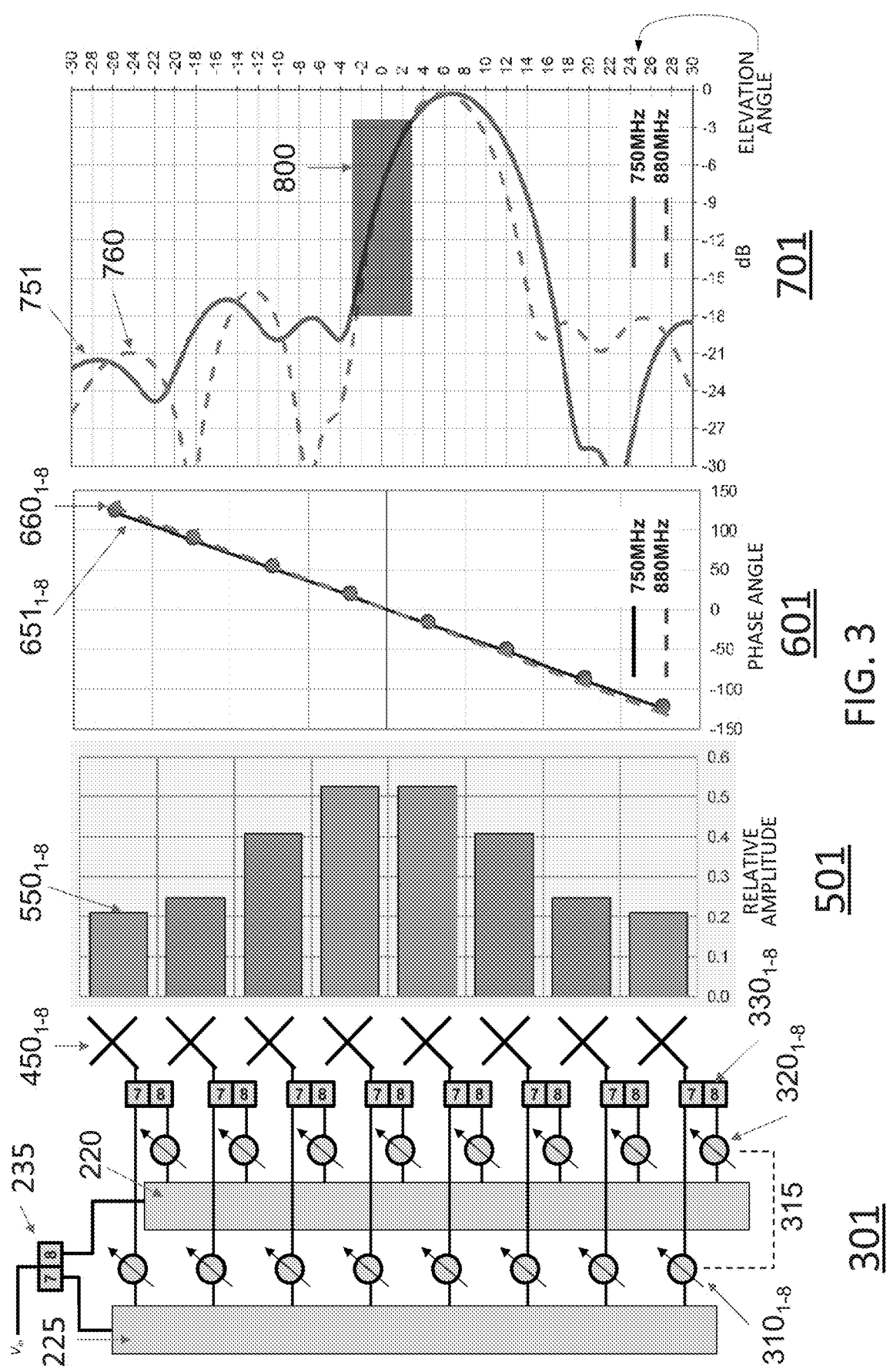
FIG. 3 illustrates a first example antenna system, an antenna element amplitude graph, a chart of relative phase at each antenna element for two different RF signal frequencies, and a graph of the resulting far field radiation patterns as a function of elevation angle for the two different RF signal frequencies.

Examples of the present disclosure optimize antenna elevation beam radiation patterns for use with dual-band or multi-band radios without the need for separate tilt control of different bands and without separate antenna elements or antenna arrays for each band. FIG. 3 illustrates an example antenna system 301, the operations of which are described in connection with an example of the processing of an RF signal intended for transmission. A dual-band RF input signal Vin comprising RF signals in a 700 MHz spectrum band (e.g., 750 MHz) and an 850 MHz spectrum band (e.g., 880 MHz) is connected to a first diplexing filter 235 which separates the dual-band RF signal into two frequency dependent component signals; the first frequency dependent component signal being associated with the 700 MHz band ("7") and the second frequency dependent component signal being associated with the 850 MHz band ("8"). The 700 MHz band frequency dependent component signal is processed via a first RF feed network 225 (also referred to herein as a "RF distribution network") and a first phase shifting network comprising eight phase shifters $310_{1-8}$ producing a set of eight component signals of the first frequency dependent component signal. The 850 MHz band frequency dependent component signal is processed via a second RF feed network 220 and a second phase shifting network comprising eight phase shifters $320_{1-8}$ producing a series of eight component signals of the second frequency dependent component signal. The respective outputs of the series of eight component signals of the first frequency dependent component signal (700 MHz band) and the series of eight component signals of the second frequency dependent component signal (850 MHz), are combined in a series of eight dual-band diplexing filters $330_{1-8}$. The series of combined RF signals connected to antenna elements in an antenna array, in this case one polarized array of a dual-polarized array of antenna elements ($450_{1-8}$).

Each phase shifting network $310_{1-8}$ and $320_{1-8}$ is designed to impart a variable phase slope function for each respective band along the antenna array ($450_{1-8}$) in order to vary elevation plane radiated pattern beam tilt. The two phase shifting networks $310_{1-8}$ and $320_{1-8}$ could be independently controlled to create variable electrical tilt (VET) beam tilts to ensure cell edge coverage footprints for each band are overlaid with each other. However, in the present example, a single VET control is used and the two phase shifting networks are coupled to each other via a coupling mechanism, e.g., tilt controller 315, where the coupling is designed to deliver a greater boresight beam tilt angle for the 700 MHz band signals than the 850 MHz band signals, to ensure a more optimal cell edge overlay between the two bands. In one example, the tilt controller 315 may comprise a mechanical linkage between the two phase shifting networks or an electrical connection for control signals. The present example maintains a similar radiated pattern around the −3° to +3° region of the elevation patterns, regardless of boresight tilt angle of the component RF frequencies. This particular range of angles (−3° to +3° region) will generally encompass the cell edge and most of the cell area for typical macro cell sites, including undulating terrain and buildings. For example, a base station cell site having an antenna height above the ground of 25 m and a cell edge distance from the cell site of 1.4 km over flat earth equates to an inclination angle of +1 degree. It can also be shown that the area of the cell within +1° and +3° inclination represents well over 80% of the cell total area.

The illumination function of the antenna array is shown by the antenna element amplitude graph 501 which illustrates the relative amplitudes of component signals $550_{1-8}$ at the respective antenna elements $450_{1-8}$ from either of the RF distribution networks 225 or 220, which in this example are essentially the same feed network. The illumination function of the present example is essentially invariant with respect to RF frequency. The phase profiles or relative phase at each antenna element $651_{1-8}$ and $660_{1-8}$, are depicted in the chart 601 for two different RF signal frequencies of 750 MHz and 880 MHz, respectively. It should be noted that the signal frequency of 750 MHz may fall within the 700 MHz band (which may range from 698-803 MHz, in one example), and the signal frequency of 880 MHz may fall within the 850 MHz band (which may range from 824-894 MHz, in one example). The graph 701 depicts the resulting far field radiation patterns 751 and 760 as a function of elevation angle (over −30 degrees to +30 degrees), for the two different RF signal frequencies of 750 MHz and 880 MHz, respectively. The coupled RF phase shifting networks $310_{1-8}$ & $320_{1-8}$ introduce phase delays for each respective spectrum band such that the radiated patterns are similar over the angular range −3° and +3°. In FIG. 3, the 880 MHz RF signal has a beam tilt of 6 degrees and the 750 MHz RF signal has a beam tilt of around 7 degrees, such that the radiation patterns for both RF signals are well aligned around the range of angles most critical for determining cell range and service footprint, in this case the region 800 highlighted in the graph 701 of FIG. 3 as the elevation angles between −3 degrees and +3 degrees.

It should be understood that example of FIG. 3 is described for a portion of the antenna system 301 that includes a first polarization component array of the dual-polarized array of antenna elements $450_{1-8}$. Thus, the antenna system 301 may include the same or similar components for the second polarization component array (e.g., additional feed/distribution networks, additional phase shifting networks, additional dual-band diplexing filters, etc.).

Figure 4:
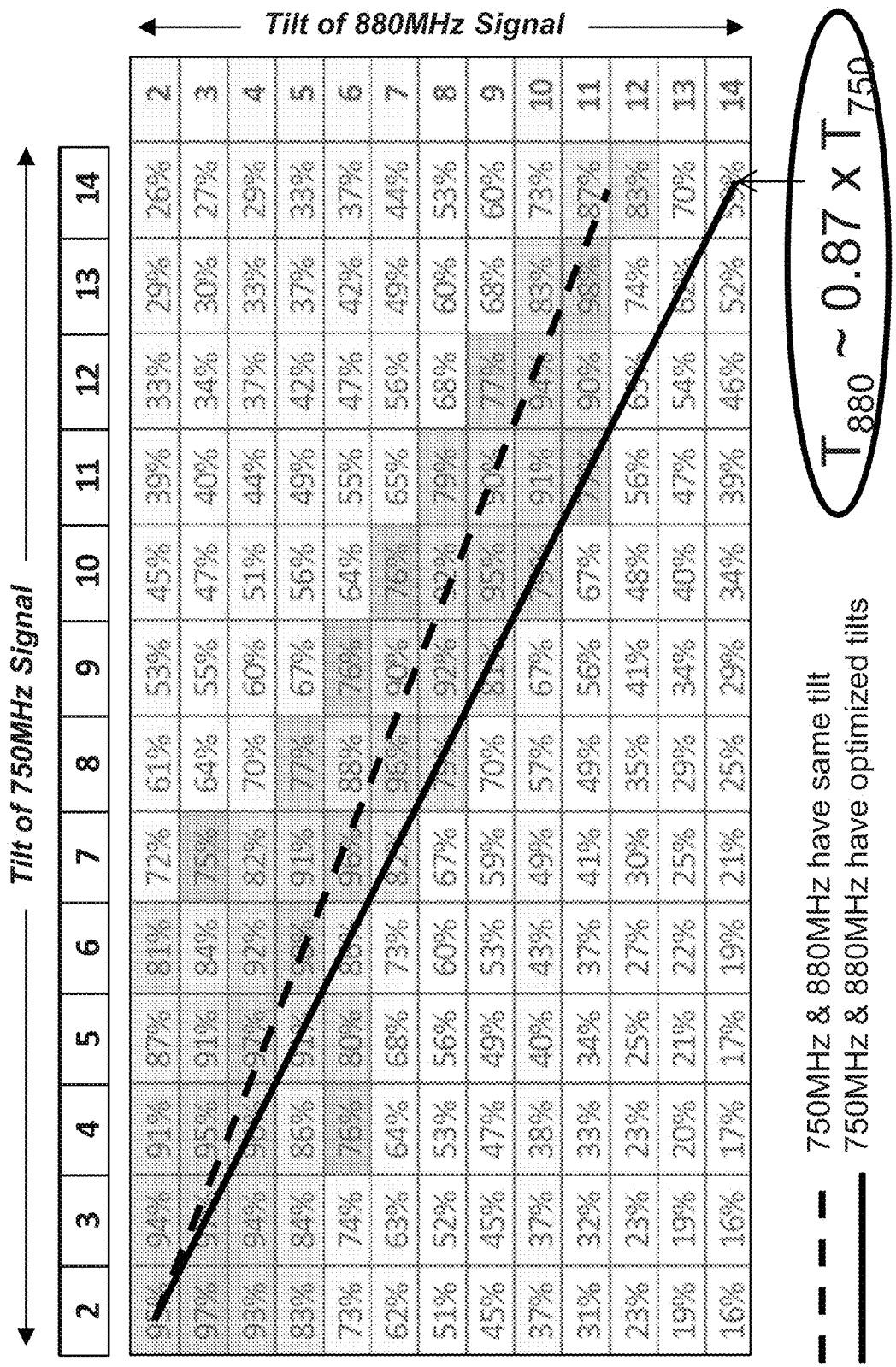
FIG. 4 illustrates a table of values representing the outputs of RF propagation simulations of how well correlated the service coverage footprints are aligned between signals carrying 750 MHz and 880 MHz communications services using a conventional antenna system.

FIG. 4 depicts a table 499 which has values representing the outputs of RF propagation simulations of how well correlated the service coverage footprints are aligned between signals carrying 750 MHz and 880 MHz communications services using a conventional antenna system, as a function of boresight tilt for each RF signal and with a base station antenna height of 30 m. For example, the table 499 reveals that if the 750 MHz and 880 MHz RF signals are both tilted at 10 degrees, there is an 79% goodness metric for service footprint correlation, measured as the smaller of (a) the coverage area of the 750 MHz service divided by the coverage area of the 880 MHz service and (b) the coverage area of the 880 MHz service divided by the coverage area of the 750 MHz service. The table 499 reveals that a more optimal correlation can be achieved if the 750 MHz RF signal was tilted at 12 degrees where a 94% correlation is achieved. A regression analysis of the data indicates that an empirical formula for optimal boresight tilt values can be derived as $T_{880}=0.87 \times T_{750}$, where $T_{880}$ is the tilt value for the 880 MHz RF signals and $T_{750}$ is the tilt value for the 750 MHz signals. Extending this analysis (not shown) allows a more general empirical formula of the form $T_f=1+(f-800)/800 \times T_{800}$ to be derived where f is the frequency, $T_f$ is the tilt value for the signals at frequency f, and $T_{800}$ is the tilt value of RF signals at 800 MHz, where 800 MHz is a nominal mid-frequency of the antenna (for example, the antenna may have a nominal operational range of 698-894 MHz). Other similar antennas, for example having the same number of elements and approximate array length reveal similar outcomes and have similar empirical formulas for characterizing optimal tilt values.

In one example, the formula can be used to determine the desired coupling behavior between the two phase shifting networks $310_{1-8}$ & $320_{1-8}$ when using a single tit controller 315 (e.g., a VET controller), rather than two independent VET controls. Antenna height above ground and cell range may also be taken into account in the empirical formula to allow further optimization and to ensure cell edges of the respective frequency bands are overlaid for a range of cell deployments. However, cell height and cell edge distance tend to correlate, and as such height and range refinements tend to be less critical, and relatively insensitive. A single tilt controller 315 for controlling the respective band dependent phase shifting networks, using a tilt formula based around the average macro cell site (e.g. 25 m and 1.4 km range in the US), will almost be always more optimal than using a conventional antenna with respect to having correlated cell edge overlay between bands.

A second example varies the antenna aperture illumination function according to frequency in order to maintain a near constant beamwidth over a range of frequencies. A flat or rectangular aperture illumination function leads to narrow beamwidth, and a tapered aperture illumination function leads to wider beamwidth. Maximum directivity, and hence gain, is often preferred over a range of tilt angles while minimizing upper sidelobe levels in the elevation plane, e.g., below 15 dB relative to the mainlobe, since sidelobes can lead to inter-cell interference.

The second example includes an RF power distribution network which divides RF power across a number of antenna elements in an antenna array. The RF distribution network includes hybrid couplers for converting differentially phased RF signals into a pair of signals having different (and complementary) amplitudes (e.g., the amplitude differences are a function of the phase difference). These signals having varying amplitudes are used to drive antenna elements in the antenna array as part of the aperture illumination function. The phase difference of the differentially phased signals is generated by using RF lines of different lengths, where the phase difference is frequency-dependent and varies as an inherent function of frequency.

Figure 5:
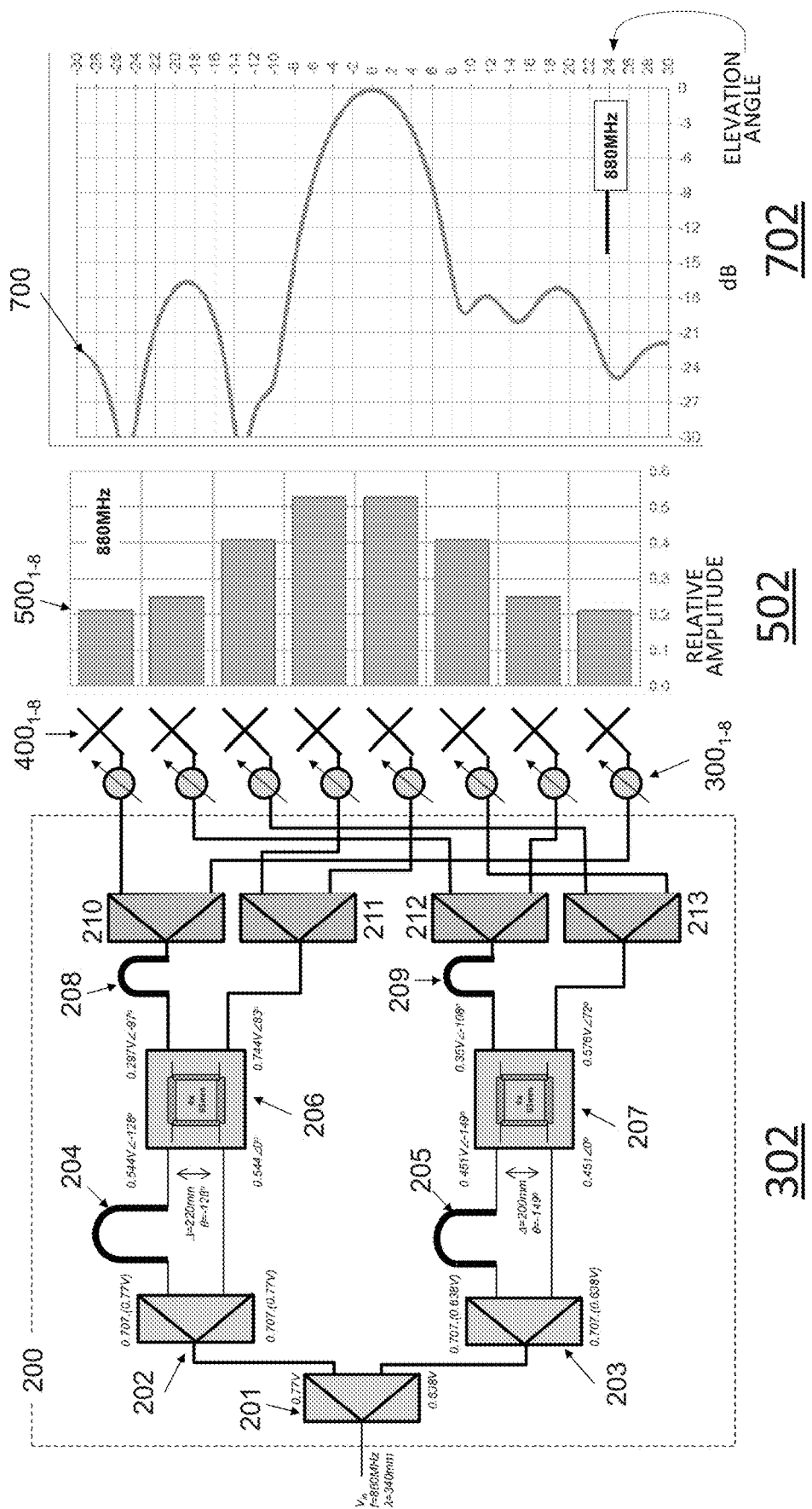
FIG. 5 illustrates a second example antenna system, an antenna element amplitude graph for a first RF signal frequency, and a graph of the resulting far field radiation patterns as a function of elevation angle for the first RF signal frequency.

The second example antenna system 302 is described in reference to FIG. 5 and in connection with the processing of an RF signal intended for transmission. An input signal, V at frequency 880 MHz, having a corresponding wavelength of 340 mm, is connected to an RF distribution network 200. The signal is first split into two component signals via a RF splitter 201. The first component signal is split into third and fourth component signals via an equal power splitter 202. The second component signal is split into fifth and sixth component signals via an equal power splitter 203.

The third and fourth component signals are fed to a first quadrature hybrid coupler 206, where the third component signal is fed via a first fixed line length 204 (which is approximately 220 mm longer than a line length for the fourth component signal) such as to impart a phase difference of 128 degrees between third and fourth component signals at the input ports of the first quadrature hybrid coupler 206. The first quadrature hybrid coupler 206 is tuned to a designated frequency within a range of RF frequencies supported by the array of antenna elements $400_{1-8}$, e.g., a center or mid-frequency of 810 MHz, and constructed of four quarter-wavelength λ/4 branches of approximately 93 mm line length as illustrated. The two output signals from the first quadrature hybrid coupler 206 have vector equations as shown by the outputs of the first quadrature hybrid coupler 206. These output equations take account of the phase mismatches associated with signals at 880 MHz and that the quadrature hybrid coupler 206 in the present example is tuned to 810 MHz (where an input signal at 810 MHz will result in output signals having a 90 degree phase difference). The amplitude difference of the two output signals is dependent upon the phase difference exhibited by the third and fourth component signals input to the first quadrature hybrid coupler 206. The first output signal from the first quadrature hybrid coupler 206 is delayed by a second fixed line length 208 being tuned to impart a 180 degree phase delay at 810 MHz, which is connected in turn to a two-way equal power RF splitter 210 providing RF drive signals for antenna elements $400_1$ and $400_8$. The second output signal from the first quadrature hybrid coupler 206 is not delayed and is connected to a two-way equal power RF splitter 211 providing RF drive signals for antenna elements $400_4$ and $400_5$.

The fifth and sixth component signals are connected to a second quadrature hybrid coupler 207, where the fifth component signal is fed via a third fixed line length 205 (which is approximately 200 mm longer than a line length for the sixth component signal) such as to impart a phase difference of 149 degrees between fifth and sixth component signals at the input ports of the second quadrature hybrid coupler 207. The second quadrature hybrid coupler 207 is also tuned to a center frequency of 810 MHz and constructed of four quarter-wavelength λ/4 branches of approximately 93 mm line length as illustrated. The two output signals from the second quadrature hybrid coupler 207 have vector equations as shown by the outputs of the second quadrature hybrid coupler 207. These output equations take account of the phase mismatches associated with signals at 880 MHz and that the second quadrature hybrid coupler 207 in the present example is tuned to 810 MHz (where an input signal at 810 MHz will result in output signals having a 90 degree phase difference). The amplitude difference of the two output signals is dependent upon the phase difference exhibited by the fifth and sixth component signals input to the second quadrature hybrid coupler 207. The first output signal from the second quadrature hybrid coupler 207 is delayed by a fourth fixed line length 209 being tuned to impart a 180 degree phase delay at 810 MHz, which is connected in turn to a two-way equal power RF splitter 212 providing RF drive signals for antenna elements $400_2$ and $400_7$. The second output signal from the second quadrature hybrid coupler 207 is not delayed and is connected to a two-way equal power RF splitter 213 providing RF drive signals for antenna element $400_3$ and $400_6$.

A phase shifting network of variable phase shifters $300_{1-8}$ is disposed between the outputs of the final stage of RF splitters (210, 211, 212, 213) and the array of antenna elements $400_{1-8}$ to provide variable electrical tilt (VET) control of the elevation plane beam. The graph 502 in FIG.

5 depicts the relative amplitudes of the RF drive signals $500_{1-8}$ corresponding to each antenna element $400_{1-8}$ and hence illustrates the illumination function of the antenna aperture, which in this example has a symmetric taper where amplitude increases from the edge elements to the center elements. The graph 702 depicts the far field radiation pattern 700 as a function of elevation angle (over −30 degrees to +30 degrees) representative of the aperture illumination function $500_{1-8}$ with no additional phase shifts applied to the elements from phase shifting network $300_{1-8}$. The radiated pattern has a vertical beamwidth of about 7 degrees (e.g., half-power beamwidth (HPBW)) and upper sidelobe levels of less than −17 dB.

Figure 6:
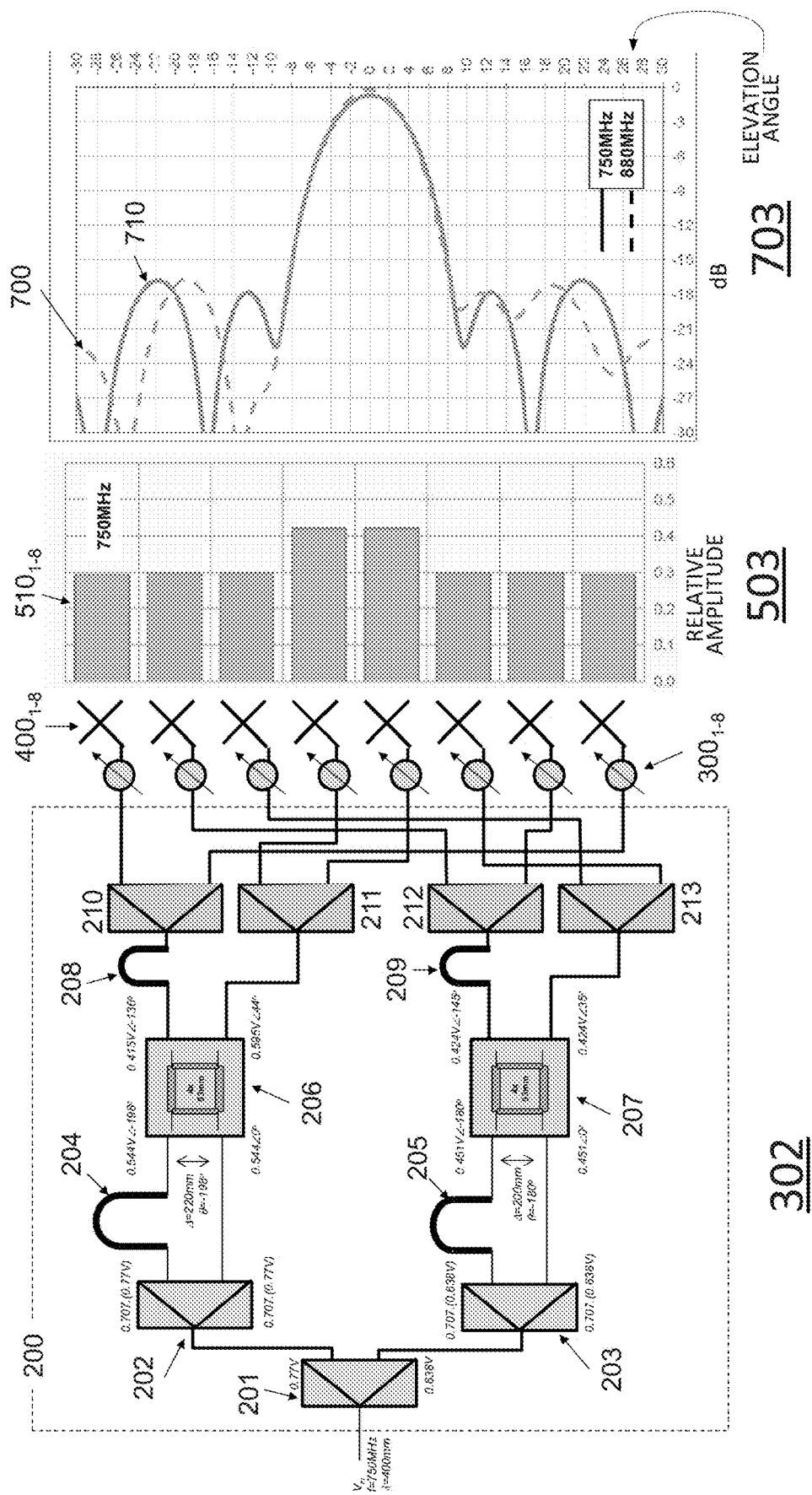
FIG. 6 illustrates the second example antenna system, an antenna element amplitude graph for a second RF signal frequency, and a graph of the resulting far field radiation patterns as a function of elevation angle for two RF signal frequencies.

FIG. 6 depicts the same antenna system 302 as FIG. 5, but for an input signal, V, at 750 MHz being processed. When a signal of 750 MHz, having a corresponding wavelength of 400 mm is input to the RF distribution network 200, the fixed line lengths 204 and 205 create phase differentials across the inputs to the first quadrature hybrid coupler 206 and across the inputs to the second quadrature hybrid coupler 207, which are different phase differentials to those in the preceding example of a signal of 880 MHz being processed. These phase differentials in turn create signal amplitudes at the outputs of the first quadrature hybrid coupler 206 and at the outputs of the second quadrature hybrid coupler 207, which are different signal amplitudes to those in preceding example of a signal of 880 MHz being processed. The outputs of the quadrature hybrid couplers 206 and 207 are phase corrected by fixed line lengths 208 and 209 and further split by equal power RF splitters (210, 211, 212, 213) which create an illumination function across the array of elements $400_{1-8}$, as previously described.

The resulting illumination function of the aperture for an input signal of 750 MHz is shown in the graph 503 as RF signal amplitudes $510_{1-8}$. The illumination function in FIG. 6 is much more rectangular (e.g., flat/non-tapered) than the illumination function $500_{1-8}$ associated with the processing of a signal at 880 MHz by the RF distribution network 200. In other words, the graph 502 illustrates a greater amplitude taper of the illumination function as compared to the illumination function of the graph 503. However, it should be noted that the illumination function $510_{1-8}$ is not entirely rectangular in that the two center elements have a slightly stronger amplitude than the other elements. The graph 703 depicts the far field radiation pattern 710 as a function of elevation angle (over −30 degrees to +30 degrees) representative of the aperture illumination function $510_{1-8}$ with no additional phase shifts applied to the elements from phase shifting network $300_{1-8}$. The radiated pattern has a vertical beamwidth of about 7 degrees and upper sidelobe levels of less than −17 dB. However, the mainbeam radiated pattern is almost identical to the radiated pattern for a signal of 880 MHz (shown in graph 703 as far field radiation pattern 700). In addition, the RF distribution network 200 provides mainbeam patterns that remain relatively invariant (e.g., within 1 dB difference at any tilt angle of interest, such as +/−3 degrees above and below the horizon) over a range of frequencies from 700 MHz to 960 MHz. As such, the example of FIGS. 5 and 6 is suitable for triple-band LTE carrier aggregation (CA) applications.

It should be noted that at least one of splitter ratios of the plurality of splitters or lengths of the plurality of fixed line lengths are tuned to provide the greater amplitude taper to the illumination function for the higher band signal (e.g., 880 MHz) as compared to the illumination function for the lower band signal (e.g., 750 MHz). Thus, it should be understood that in other, further, and different examples, the array of antenna elements $400_{1-8}$ may support a different range of RF frequencies and/or the frequency bands of the component signals of the input signal may be different. In addition, the quadrature hybrids 206 and 207 may have different dimensions and may be tuned to different frequencies. Alternatively, or in addition, the feed network 200 may utilize different splitter ratios and/or line lengths so as to provide the greater amplitude taper to the radiation pattern for a higher-band component signal as compared to a lower-band component signal of an input signal.

The foregoing examples illustrate the principles of the present disclosure with regard to passive RF distribution and phase shifting networks. However, additional examples of the present disclosure also include baseband beamforming where amplitude and phase weights are generated at baseband associated with the respective component RF frequencies, such that the resultant elevation radiation patterns for different RF frequency components are aligned with each other over the range of elevation angles that are used to determining the cell range. The alignment can be achieved through adjusting the respective tilt angles for two component frequency signals in a coordinated manner (e.g., using the formulas described above in connection with the examples of FIGS. 3 and 4) and/or via adjusting the beamwidth, or illumination function taper, as described in connection with the example of FIGS. 5 and 6.

Figure 7:
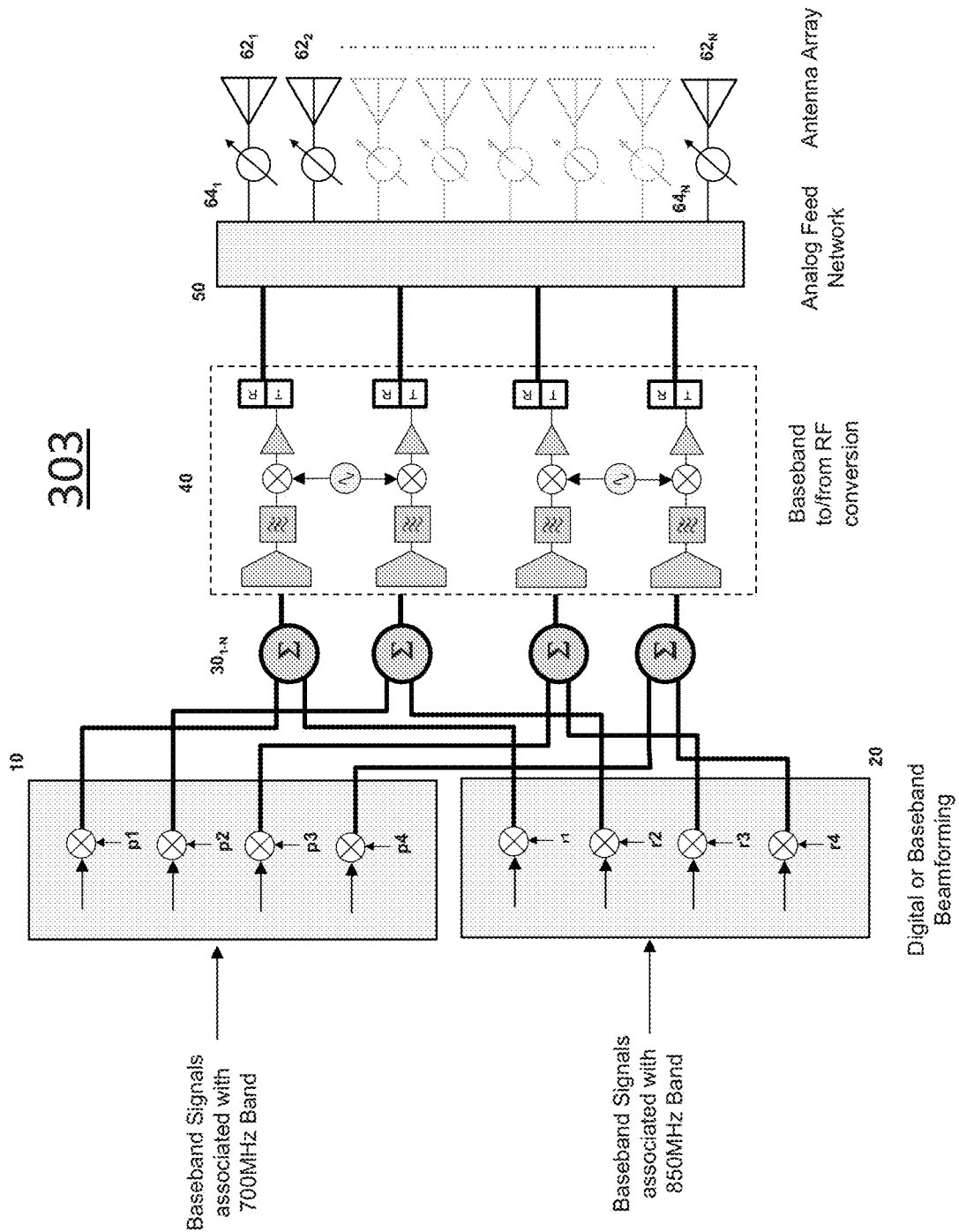
FIG. 7 illustrates an example antenna system with digital beamforming, in accordance with the present disclosure.

FIG. 7 illustrates an example antenna system 303 where digital beamforming is applied. A first baseband signal intended for transmission at an RF band at 700 MHz is split into component baseband signals and vector weights (p1 to p4) are applied to the component baseband signals of the first baseband signal at a first baseband beamforming unit 10. A second baseband signal intended for transmission at an RF band at 850 MHz is split into component baseband signals and vector weights (r1 to r4) are applied to the component baseband signals of the second baseband signal at a second baseband beamforming unit 20. The baseband component signals from the first baseband signal and the baseband component signals from the second baseband signals are vector summed using summing functions $30_{1-N}$ (broadly a "vector summing unit"). The composite baseband component signals are then upconverted from baseband to RF and amplified via baseband-to-RF conversion unit 40. The resulting RF signals are then fed to N antenna elements $62_{1-N}$, via an analog feed network 50. The analog feed network 50 is optional and serves to distribute four composite RF signals (drive signals) to antenna elements $62_{1-N}$, e.g., 8 antenna elements. In one example, an optional analog phase shifting network $64_{1-N}$ can be used for additional tilt control.

While the foregoing describes various examples in accordance with one or more aspects of the present disclosure, other and further example(s) in accordance with the one or more aspects of the present disclosure may be devised without departing from the scope thereof, which is determined by the claim(s) that follow and equivalents thereof. For instance, for illustrative purposes the foregoing examples are described primarily with respect to transmit signals. However, it should be understood that the foregoing examples are equally applicable to receive signals with respect to the same or similar frequency band and/or frequency component signals.

Various aspects of the present disclosure may also include the following:

Examples of the present disclosure include antenna systems for multi-band cellular base station deployment having elevation plane radiation patterns for different RF component frequencies such that the resultant service cell range or footprint for different RF component frequencies are substantially similar.

In one example a phased array antenna system may comprise a plurality of antenna elements, the antenna system supporting RF signals over a range of RF frequencies and creating a directive beam in the elevation plane having a single variable electrical tilt control means, characterized in that the range of the service area coverage footprint formed for a first frequency component signal of the RF signal is substantially identical to the range of the service area coverage footprint formed for different frequency component signals of the RF signal, for a range of electrical tilt angles associated with the first frequency component signal of the RF signal. In one example, the antenna system may be connected to a radio system for transmission and reception of RF signals with component signals from at least two RF spectrum bands. In addition, in one example, the radio system may be connected to a baseband unit providing carrier aggregation features in at least two RF spectrum bands supported by the radio system.

In one example, the elevation plane radiation pattern is substantially invariant over the range of elevation angles +/−3 degrees with respect to the horizon for a range of frequencies supported by the phased array antenna system. In addition, in one example, the majority of the mainbeam elevation plane radiation pattern is substantially invariant across a range of frequencies supported by the phased array antenna system.

In one example, the phased array antenna system comprises a first diplexor for splitting an RF signal into at least a first frequency dependent component signal and a second frequency dependent component signal, where the phased array antenna system is further to split the first frequency dependent component signal into further component signals and to connect to a first phase shifting network for delivering variable electrical tilt for the first frequency dependent component signal, where the phased array antenna system is further to split the second frequency dependent component signal into further component signals and to connect to a second phase shifting network for delivering variable electrical tilt for the second frequency dependent component signal, the phased array antenna system further comprising a coupling mechanism between first and second phase shifting networks.

In one example, the antenna system includes a feed network which creates pairs of component signals, each pair of component signals having a phase difference dependent upon RF frequency and being converted into pairs of component signals characterized in having amplitude differences, the amplitude differences being dependent upon the component signal pair phase differences, which are used as drive signals for the antenna array illumination function. In such an example, the antenna element drive signals may have an array illumination function which has increasing amplitude taper with increasing RF frequency.

In one example, the radio system comprises an active beamforming network, and the beamforming is developed at baseband. Example embodiments may also include methods of operating any of the example phased array antenna system described above for transmit signals, receive signals, or both transmit signals and receive signals.

What is claimed is:

1. An antenna system comprising:
   an antenna array comprising a plurality of antenna elements;
   a first baseband beamforming unit, to apply a first plurality of precoding weights to a first set of component signals associated with a first frequency; and
   a second baseband beamforming unit, to apply a second plurality of precoding weights to a second set of component signals associated with a second frequency;
   wherein the first frequency is less than the second frequency; and
   wherein:
      the first plurality of precoding weights is to impart a first tilt angle to a first radiation pattern of the antenna array for the first set of component signals, wherein the second plurality of precoding weights is to impart a second tilt angle to a second radiation pattern of the antenna array for the second set of component signals, wherein the first plurality of precoding weights and the second plurality of precoding weights are configured to maintain a ratio between the first tilt angle and the second tilt angle, wherein the first tilt angle is greater than the second tilt angle, and wherein the ratio of the second tilt angle to the first tilt angle is less than one; or
      the first plurality of precoding weights is to impart a first beamwidth to a first radiation pattern of the antenna array for the first set of component signals, wherein the second plurality of precoding weights is to impart a second beamwidth to a second radiation pattern of the antenna array for the second set of component signals, wherein the first plurality of precoding weights and the second plurality of precoding weights are configured to maintain the first beamwidth and the second beamwidth to provide a same mainbeam far-field radiation pattern for both the first radiation pattern and the second radiation pattern.

2. The antenna system of claim 1, further comprising:
   a vector summing unit to combine respective component signals of the first set of component signals and of the second set of component signals into a set of combined signals; and
   a baseband-to-radio frequency (RF) conversion unit, to convert the combined signals into RF signals.

3. The antenna system of claim 2, further comprising:
   a feed network to distribute the RF signals as drive signals of the plurality of antenna elements.

4. The antenna system of claim 3, wherein the antenna array comprises a first component array for a first polarization and a second component array for a second polarization, wherein the first component array is coupled to the feed network.

5. The antenna system of claim 1, wherein the antenna array supports radio frequency (RF) signals over a range of RF frequencies, wherein the range of RF frequencies includes the first frequency and the second frequency.

6. The antenna system of claim 5, wherein the ratio is maintained in accordance with $T_f = 1 + (f-n)/n \times T_n$, where n is a mid-frequency of the range of RF frequencies and $T_n$ is the tilt angle of the mid-frequency, and where either: $T_f$ is the first tilt and f is the first frequency, or $T_f$ is the second tilt and f is the second frequency.

7. The antenna system of claim 1, wherein the ratio is maintained in accordance with $T_1 = M \times T_2$, where $T_1$ is the first tilt angle, $T_2$ is the second tilt angle, and M is the ratio less than one.

8. The antenna system of claim 1, wherein the first radiation pattern and the second radiation pattern provide a substantially identical coverage footprint for a range of angles from three degrees above the horizon to three degrees below the horizon for a deployment of the antenna array.

9. A method comprising:
applying, via a first baseband beamforming unit, a first plurality of precoding weights to a first set of component signals associated with a first frequency; and
applying, via a second baseband beamforming unit, a second plurality of precoding weights to a second set of component signals associated with a second frequency;
wherein the first frequency is less than the second frequency; and
wherein:
the first plurality of precoding weights is to impart a first tilt angle to a first radiation pattern of an antenna array comprising a plurality of antenna elements for the first set of component signals, wherein the second plurality of precoding weights is to impart a second tilt angle to a second radiation pattern of the antenna array for the second set of component signals, wherein the first plurality of precoding weights and the second plurality of precoding weights are configured to maintain a ratio between the first tilt angle and the second tilt angle, wherein the first tilt angle is greater than the second tilt angle, and wherein the ratio of the second tilt angle to the first tilt angle is less than one; or
the first plurality of precoding weights is to impart a first beamwidth to a first radiation pattern of the antenna array for the first set of component signals, wherein the second plurality of precoding weights is to impart a second beamwidth to a second radiation pattern of the antenna array for the second set of component signals, wherein the first plurality of precoding weights and the second plurality of precoding weights are configured to maintain the first beamwidth and the second beamwidth to provide a same mainbeam far-field radiation pattern for both the first radiation pattern and the second radiation pattern.

10. The method of claim 9, further comprising:
combining, via a vector summing unit, respective component signals of the first set of component signals and of the second set of component signals into a set of combined signals; and
converting, via a baseband-to-radio frequency (RF) conversion unit, the combined signals into RF signals.

11. The method of claim 10, further comprising:
distributing, via a feed network, the RF signals as drive signals of the plurality of antenna elements.

12. The method of claim 11, wherein the antenna array comprises a first component array for a first polarization and a second component array for a second polarization, wherein the first component array is coupled to the feed network.

13. The method of claim 9, wherein the antenna array supports radio frequency (RF) signals over a range of RF frequencies, wherein the range of RF frequencies includes the first frequency and the second frequency.

14. The method of claim 13, wherein the ratio is maintained in accordance with $T_f = 1 + (f-n)/n \times T_n$, where n is a mid-frequency of the range of RF frequencies and $T_n$ is the tilt angle of the mid-frequency, and where either: $T_f$ is the first tilt and f is the first frequency, or $T_f$ is the second tilt and f is the second frequency.

15. The method of claim 9, wherein the ratio is maintained in accordance with $T_1 = M \times T_2$, where $T_1$ is the first tilt angle, $T_2$ is the second tilt angle, and M is the ratio less than one.

16. The method of claim 9, wherein the first radiation pattern and the second radiation pattern provide a substantially identical coverage footprint for a range of angles from three degrees above the horizon to three degrees below the horizon for a deployment of the antenna array.

* * * * *